United States Patent
Essaian et al.

(10) Patent No.: US 7,570,676 B2
(45) Date of Patent: Aug. 4, 2009

(54) COMPACT EFFICIENT AND ROBUST ULTRAVIOLET SOLID-STATE LASER SOURCES BASED ON NONLINEAR FREQUENCY CONVERSION IN PERIODICALLY POLED MATERIALS

(75) Inventors: Stepan Essaian, San Jose, CA (US); Andrei Shchegrov, Campbell, CA (US)

(73) Assignee: Spectralus Corporation, San Jose, CA (US)

( * ) Notice: Subject to any disclaimer, the term of this patent is extended or adjusted under 35 U.S.C. 154(b) by 143 days.

(21) Appl. No.: 11/788,918

(22) Filed: Apr. 23, 2007

(65) Prior Publication Data
US 2007/0263693 A1 Nov. 15, 2007

Related U.S. Application Data

(60) Provisional application No. 60/798,790, filed on May 9, 2006.

(51) Int. Cl.
*H01S 3/10* (2006.01)
(52) U.S. Cl. .......................... 372/21; 372/22
(58) Field of Classification Search ............ 372/21, 372/22, 5, 10, 11
See application file for complete search history.

(56) References Cited

U.S. PATENT DOCUMENTS

| | | | | |
|---|---|---|---|---|
| 6,259,711 | B1 * | 7/2001 | Laurell | 372/22 |
| 6,370,168 | B1 * | 4/2002 | Spinelli | 372/22 |
| 6,587,487 | B2 * | 7/2003 | Yin | 372/22 |
| 7,218,655 | B2 * | 5/2007 | Wang et al. | 372/29.01 |
| 2006/0233206 | A1 * | 10/2006 | Miner et al. | 372/22 |

* cited by examiner

*Primary Examiner*—Armando Rodriguez
(74) *Attorney, Agent, or Firm*—Kevin L. Pontius; Dickinson Wright PLLC

(57) ABSTRACT

A compact and efficient ultraviolet laser source based on a optically-pumped solid-state or fiber laser that produces near-infrared output light suitable for nonlinear frequency conversion. The infrared laser output is frequency tripled or quadrupled to produce light in the ultraviolet wavelength range (200 nm to 400 nm). The novel technology is the use of highly efficient periodically poled nonlinear crystals, such as stoichiometric and MgO-doped lithium tantalate and lithium niobate. As opposed to conventional frequency-converted UV laser sources, which have high power consumption, high cost, and low efficiency, the laser sources of this invention utilize high efficiency nonlinear conversion provided by periodically poled materials and allow lower-cost architectures without additional focusing lenses, high power pump diodes, etc.

21 Claims, 6 Drawing Sheets

COMPACT EFFICIENT AND ROBUST ULTRAVIOLET SOLID-STATE LASER SOURCES BASED ON NONLINEAR FREQUENCY CONVERSION IN PERIODICALLY POLED MATERIALS

PRIORITY INFORMATION

This application claims priority from, commonly assigned U.S. Provisional Application U.S. 60/798,790, filed May 9, 2006.

FIELD OF THE INVENTION

This invention relates to a novel solid state laser which generates ultraviolet light in the 200-400 nm wavelength range.

BACKGROUND OF THE INVENTION

Compact and efficient ultraviolet (UV) laser sources in the wavelength range 200-400 nm are desirable for many applications. Because ultraviolet lasers can be focused to smaller spot sizes than longer-wavelength light sources, they are in demand for high resolution patterning and for drilling tiny holes in miniature circuit boards. In the semiconductor industry, ultraviolet lasers can be used for the detection of foreign particles in clean rooms. This helps to reduce problems in the miniaturization of patterns associated with the integration of semiconductor devices. Similarly, short-wavelength lasers are advantageous for the examination of wafer surfaces in the semiconductor industry. In semiconductor industry manufacturing processes, ultraviolet lasers are widely used in lithography, although existing systems are neither compact nor efficient and are based on excimer laser technology. In consumer electronics, short wavelength lasers can be used for the formation of the recording pits that define high density recording.

Since short-wavelength radiation is easily absorbed by most materials, another application is the detection and classification of materials and substances in security and defense. One technique used in such laser applications is called fluorescence spectroscopy and is based on the ability of ultraviolet light to excite molecules of target materials and produce detectable and distinct wavelength-shifted emission spectra. Another security-related application is the detection of contaminants in water supplies and other materials and also the treatment of water to eliminate biohazards. The properties of high absorption of UV beams and tight focusing make them very useful for nanotechnology and biophotonics. One particular analytical technique enabling these fields is mass spectroscopy. A known use of UV lasers, e.g. at a wavelength of 266 nm is to assist in desorption of analyte molecules from a sample.

Traditionally, ultraviolet lasers have been obtained from a bulky and high-cost gas lasers. An important class of such lasers is called "excimer" (excited dimer) lasers that employ a mixture of a reactive gas (such as $F_2$ or $Cl_2$) and an inert gas (such as Kr, Ar or Xe) as an active medium. The gas mixtures, when electrically excited, produce a pseudo-molecule, or "dimer", with an energy level configuration that allows the generation of specific ultraviolet laser wavelengths. As mentioned, the inefficiency, large size, and significant cost of such lasers prevent them from being used in many applications. In summary, there is a substantial and growing demand for compact and efficient ultraviolet laser sources that provide enhanced levels of technical performance, reliability, and cost efficiency. Ideally, one would prefer to obtain a compact ultraviolet laser source directly from a semiconductor device. However, the closest candidates that are based on GaN material system are only able to produce light with wavelengths longer than 370 nm. No other viable semiconductor material has yet been developed to provide lasers with shorter wavelengths.

Another, newer laser platform that has been used for obtaining ultraviolet laser light is based on diode-pumped solid-state (DPSS) lasers which are frequency converted from infrared wavelengths into ultraviolet wavelength via nonlinear optics. This laser platform is most commonly based on Nd-doped solid-state crystals that can produce efficient output at several infrared wavelengths, such as 1064 nm, 946 nm, 914 nm, 1340 nm. The laser wavelength of 1064 nm is a dominant laser wavelength for such gain materials as Nd:YAG, Nd:YVO$_4$, and Nd:GdVO$_4$. The nonlinear optical crystals, such as bulk nonlinear materials as KTP(potassium titanyl phosphate) or LBO (lithium borate) can convert the infrared wavelength of 1064 nm into the green wavelength of 532 nm via a second harmonic generation process (SHG). Further, the nonlinear conversion processes called third-harmonic generation (THG) and fourth-harmonic generation allow obtaining the ultraviolet wavelengths of 355 nm and 266 nm, respectively. Ultraviolet laser products, based on solid-state laser platform are now available from commercial laser manufacturers.

To understand better the design parameters for generating UV light, one can refer to the book by W. P. Risk, T. R. Gosnell and A. V. Nurmikko, "Compact Blue-Green Lasers", Cambridge University Press (2003), at page 50. The process of generating UV light consists of two nonlinear processes both of which are sum-frequency generation (SFG) processes, described as $$\omega_1 + \omega_2 = \omega_3 \text{ in frequency or} \quad (1)$$

$$1/\lambda_1 + 1/\lambda_2 = 1/\lambda_3 \text{ in wavelength.} \quad (2)$$

The first step in generating UV light is generating visible (e.g., green) light as $$1064 \text{ nm} + 1064 \text{ nm} \rightarrow 532 \text{ nm} \quad (3)$$

and then mixing the visible and IR beams, as $$1064 \text{ nm} + 532 \text{ nm} \rightarrow 355 \text{ nm} \quad (4)$$

or doubling the frequency of the visible beam, $$532 \text{ nm} + 532 \text{ nm} \rightarrow 266 \text{ nm} \quad (5)$$

The power $P_3$ of the generated sum-frequency beams can be estimated using the equation:

$$P_3 = \frac{32\pi^2 d_{eff}^2}{\varepsilon_0 c n_3^2 \lambda_1 \lambda_2 \lambda_3} P_1 P_2 lh, \quad (6)$$

where $P_1$, $P_2$, and $P_3$ denote the power of the optical beams participating in the nonlinear process, $\lambda_1$, $\lambda_2$, and $\lambda_3$ denote wavelengths of these beams, $d_{eff}$ is the effective nonlinear coefficient for the nonlinear crystal, l is the length of the nonlinear crystal, h is the Boyd-Kleinmann's function that depends on the degree of focusing of the fundamental beam, c is the speed of light, $\varepsilon_o$ is the dielectric constant of a vacuum, and $n_3$ is the dielectric constant for the sum-frequency beam.

Equation (6) is useful in understanding the limitations of existing platforms for UV laser sources. Despite obvious advantages in efficiency and size of DPSS UV laser sources compared to gas lasers, their size, efficiency, and cost are still not satisfactory for many newer applications, especially when a UV laser source is designed to be part of a compact, portable instrument. One of the primary design limitations is the inefficiency of multiple nonlinear processes, which are required to convert the fundamental infrared laser beam into the ultraviolet beam.

To illustrate the prior art way of obtaining UV laser radiation, one can refer to U.S. Pat. No. 7,016,389. This patent describes architectures for improving nonlinear frequency tripling from the fundamental wavelength of 1064 nm into the third harmonic wavelength of 355 nm. To improve the conversion efficiency into the UV, both the second-harmonic generation (SHG) process, generating green, and the third-harmonic generation (THG) process, generating UV, are done inside the laser cavity to take advantage of the high circulating power at the fundamental wavelength. Further improvements in nonlinear conversion efficiency are achieved via Q-switching that raises the intracavity peak power at the fundamental laser wavelength.

The nonlinear materials listed in the U.S. Pat. No. 7,016, 389 as being suitable for frequency conversion processes are well known bulk nonlinear crystals LBO, KTP, $KNbO_3$, CLBO, BBO which achieve nonlinear conversion via a process called birefringent phase-matching. Of these materials, LBO can be used for generating both green and UV wavelength light. The limitation of LBO is its low nonlinearity with an effective nonlinear coefficient of under 1 pm/V for both SHG and THG processes. This limitation makes it essentially mandatory to employ complex and costly laser architectures to increase peak power and nonlinear conversion efficiencies. Using any of the nonlinear crystals listed above does not lead to an efficient and low-cost UV platform since the most efficient crystal in that list, $KNbO_3$, can be useful for generating blue wavelengths but cannot be used for efficient generation of the green and UV wavelengths due to the high walkoff and poor reliability problems. The KTP crystal, which has $d_{eff}$~3.5 pm/V for SHG conversion into the green wavelength, has reliability limitations (known as gray tracking) and is used primarily in low power green lasers. The borates (BBO, CLBO, LBO) are useful for conversion into the UV wavelength but are limited in their efficiency. Thus, it is difficult to find a combination of two nonlinear crystals that ensure efficient UV generation in a compact, low-cost architecture.

Similar limitations apply to approaches described in other patents. U.S. Pat. No. 6,002,695 and U.S. Pat. No. 6,697,391, describe high-efficiency frequency tripling or quadrupling with both nonlinear processes taking place inside the laser cavity. LBO crystals are mentioned as the preferred material for both nonlinear conversions. In addition, U.S. Pat. No. 6,697,391 suggests the use of other bulk nonlinear converters, including KTP, BBO, ADP, CBO, DADA, DADP, DKDP, and others. The platforms described in U.S. Pat. Nos. 6,002,695 and 6,697,391 are somewhat efficient but cannot be built in a compact and low-cost package due to multiple design constraints such as keeping the fixed and optimized beam sizes in both the solid-state gain crystal and in the nonlinear crystals.

A number of prior art workers chose external nonlinear conversion to improve reliability and simplicity of the UV laser system. An example of such work is U.S. Pat. No. 6,157,663. The preferred nonlinear converter for both green (SHG) and UV (THG) is LBO. While this system has advantages due to decoupling of nonlinear conversion processes from the laser cavity, it is still large and costly due to the inefficiency of nonlinear conversions in LBO. The cost is manifested in the number of laser components such as focusing lenses, temperature controls, etc. and in the size of the overall system.

Recently, there have been efforts to find a compact and low cost platform for UV laser sources. One approach is based on the so-called microchip solid-state laser architecture with passive Q-switching. A laser system based on this approach is described in the U.S. Pat. No. 6,373,864. This patent had been preceded by a number of research papers on microchip laser platform with or without Q-switching (see the list of references in U.S. Pat. No. 6,373,864). The enabling feature of this laser platform is a compact, monolithic resonator defined by the solid-state gain crystal (e.g., Nd:YAG) and saturable absorber medium (e.g., $Cr^{4+}$:YAG). The system is compact, low-cost, and delivers high peak power in sub-nanosecond pulses, which make it easier to achieve high nonlinear conversion efficiency. However, this approach is still limited in power, efficiency, and reliability due to the choice of traditional nonlinear converters: KTP, BBO, or LBO.

Even more recently, attempts to improve nonlinear conversions with newer nonlinear crystals have been made. U.S. Pat. No. 6,741,620, suggests the use of a PPKTP (periodically poled KTP) nonlinear crystal for efficient frequency doubling into the visible and then using CLBO for converting into UV. The advantage of PPKTP is its high nonlinear coefficient $d_{eff}$~9 pm/V (compared to ~3.5 pm/V for KTP and <1 pm/V for LBO). This advantage is important because SHG power scales with the square of $d_{eff}$ (see Eq. (6)). However, the design of U.S. Pat. No. 6,741,620 is neither compact nor low-cost and, in addition, PPKTP is based on KTP material and it also suffers from the same reliability (gray tracking) limitations as bulk KTP. Therefore, it has very limited potential for a scalable, low-cost, and reliable UV platform.

K. Mizuuchi, A. Morikawa, T. Sugita, K. Yamamoto, N. Pavel, and T. Taira ("Continuous-wave ultraviolet generation at 354 nm in a periodically poled $MgO:LiNbO_3$ by frequency tripling of a diode end-pumped Nd:GdVO4 microlaser," Applied Physics Letters, vol. 85, p. 3959 (2004)) demonstrated that periodically poled MgO-doped $LiNbO_3$ (PP-MgOLN) can be used for both efficient SHG (into the green) and THG (into the UV). This material has one of the highest nonlinear coefficients ($d_{eff}$~16 pm/V) of all nonlinear materials. This research paper described the concept of using PPMgOLN for UV generation. However, this paper did not provide a design for a low-cost, robust UV laser system, suitable for commercial production.

The potential of periodically poled materials based on $LiNbO_3$ and $LiTaO_3$ has been recognized for some time. However, the efforts focused on periodic poling of traditionally grown (congruent) versions of these materials. While the fabrication of these periodically poled materials has been demonstrated, they suffered from photo-refractive degradation during laser operation unless the temperature of these materials is raised to >150° C. This is a serious limitation in adopting PPLN (periodically poled lithium niobate) and PPLT (periodically poled lithium tantalate) in commercial laser systems. Therefore, doping the material with such impurities as MgO and ZnO during the crystal growth to suppress photo-refractive mechanisms (T. Volk, N. Rubinina, M. Wöhlecke, "Optical-damage-resistant impurities in lithium niobate," Journal of the Optical Society of America B, vol. 11, p. 1681 (1994)) was proposed. Finally, growing the crystals with a high degree of stoichiometry with or without dopants has been proposed as another method to suppress photo-refractive damage (Y. Furukawa, K. Kitamura, S. Takekawa, K. Niwa, H. Hatano, "Stoichiometric Mg:LiNbO$_3$ as an effective material for nonlinear optics," Optics Letters, vol. 23, p. 1892 (1998)).

However, it has been recognized that MgO and ZnO-doped and stoichiometric LiNbO$_3$ and LiTaO$_3$ are very different materials from their congruent counterparts and their modified ferroelectric properties make these materials exceedingly difficult to pole into the short-periods, several-micron-length domains, required for frequency conversion into the visible and UV spectral ranges. Therefore, periodic poling of such materials has not been done in a production environment and suggestions concerning their technological potential (such as in the paper by Mizuuchi et al.) are quite rare.

DETAILED DESCRIPTION OF THE INVENTION

The technological challenges in the periodic poling of MgO or ZnO-doped and stoichiometric LiNbO$_3$ and LiTaO$_3$ have recently been overcome by the inventors and these new materials have proven to be readily manufacturable. Short poling period crystals suitable for laser conversion into visible and near-UV wavelength ranges have been produced and technology for such production process has been described in copending, commonly assigned (Published US Patent Application 2005/0,133,477). The teaching of this patent creates an opportunity to provide an efficient and compact UV laser source platform based on solid-state lasers.

The present invention discloses compact and low-cost architectures and method for building UV laser sources based on periodically poled lithium niobate and lithium tantalate that contain dopants such as MgO or ZnO or have a specified degree of stoichiometry that ensures high reliability of these materials. The following solid-state laser platforms provide efficient and low-cost UV output:

1. UV laser source based on the compact, passively Q-switched microchip solid-state laser platform, externally converted into the visible and UV wavelength radiation
2. UV laser source based on the cw microchip solid-state laser platform, converted into the visible light by intracavity SHG and externally (single pass SHG) converted into UV light.

The family of highly efficient, reliable, and manufacturable periodically poled materials as described in the above-indicated pending application is a new and enabling feature of the present invention. These materials includes PPMgOLN (periodically poled MgO-doped lithium niobate), PPMgOLT (periodically poled MgO-doped lithium tantalate), PPZnOLN (periodically poled ZnO-doped lithium niobate), PPZnOLT (periodically poled ZnO-doped lithium niobate), PPSLN (periodically poled stoichiometric or near-stoichiometric lithium niobate), and PPSLT (periodically poled stoichiometric or near-stoichiometric lithium niobate).

The preferred embodiments for the compact UV laser sources of this invention are illustrated in FIGS. 1-5. It should be understood that these figures provide the detail necessary to illustrate more general concepts and reasonable deviations from the configurations shown are also within the scope of the present invention.

Figure 1:
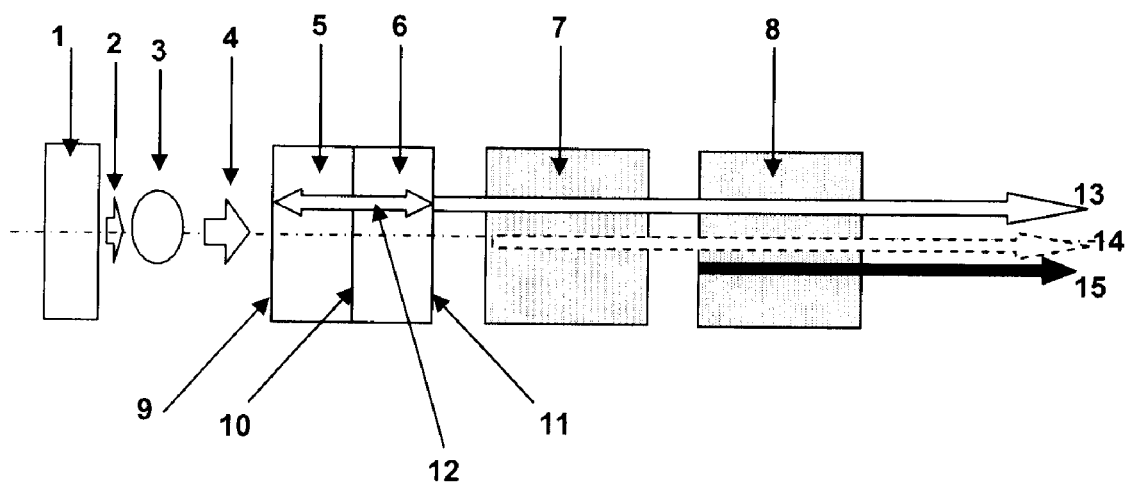
FIG. 1. Ultraviolet, pulsed laser source with passively Q-switched, infrared, solid-state, microchip laser, external second-harmonic generation using a periodically poled nonlinear crystal, and external third harmonic generation using a periodically poled nonlinear crystal. The two crystals may be integrated in a single optical chip with two poling sections.

FIG. 1 illustrates an ultraviolet, pulsed laser source with a passively Q-switched, infrared, solid-state, microchip laser, external second-harmonic generation using a periodically poled nonlinear crystal, and external third harmonic generation using a periodically poled nonlinear crystal. The two crystals may be integrated in a single optical chip with two poling sections.

The pump diode laser 1 emits a beam 2, preferably at a wavelength between 800 and 900 nm, such as ~808 nm or 885 nm for efficient absorption into the gain material 8. The beam 2 is usually astigmatic and beam-shaping optics 3 is used to convert the pump beam 2 into beam 4 so that beam 4 can form a circular cross-section of the desired diameter on surface 9 of the gain crystal 5. This type of pumping scheme can efficiently overlap the pump area in the gain crystal with the intracavity circulating beam, which should be a single-spatial mode (or TEM$_{00}$) for efficient nonlinear frequency doubling. A typical diameter for the pump spot on the gain crystal 5 is in the range of 100 to 300 microns. The output power of laser diode 1 is in the range of several Watts. The beam-shaping optics can be a micro-lens, a gradient-index lens, or a combination of such optical elements. When efficiency can be sacrificed in favor of simplicity and compactness, the beam-shaping optics 3 can be eliminated. Another part of assembly 3 may be a volume Bragg grating used to narrow down the spectral emission of the diode laser 1. Narrowing down the spectral output of the pump laser may be beneficial for the efficiency of the solid-state laser. Methods to achieve such spectral narrowing have been described, e.g., in the paper by L. Glebov. "Optimizing and Stabilizing Diode Laser Spectral Parameters," Photonics Spectra, January 2005.

The gain medium 5 is preferably a Nd-doped crystal with a higher gain in one axis, such as Nd:YVO$_4$ or Nd:GdVO$_4$ so that the element 5 provides both gain and polarization control for the laser cavity. Alternatively, a gain crystal such as Nd:YAG with equal gain for both crystalline axes can be used. One advantage of using Nd:YAG is that it can provide a lasing wavelength of 946 nm that can be frequency doubled into 473 nm and then tripled to provide a 237 nm output beam. In case of using Nd:YAG, a method of polarization control for the solid-state laser is necessary. These may include adding extra polarizing elements such as Brewster surfaces, waveplates, or using a polarization sensitive saturable absorber element as described below to provide higher loss to the undesired polarization. These methods are known in the art of making infrared microchip solid-state lasers and can be implemented by skilled laser designers and will not be discussed further. Further discussion on this topic can be found, for example, in the paper by H. Liu, O. Homia, Y. C. Chen, and S.-H. Zhou, "Single-frequency Q-switched Cr—Nd:YAG laser operating at 946-nm wavelength," IEEE Journal of Selected Topics in Quantum Electronics, Vol. 3, p. 26 (1997) and references cited therein.

The level of Nd doping for maximizing laser efficiency in our invention will typically be in the range of 1% to 3% atm (atomic percent). The crystal 5 also provides the transverse mode control in the otherwise flat-flat laser cavity through gain-guiding and thermal lensing effects. Element 6 is a saturable absorber that is used for passive Q-switching of the laser. In a preferred embodiment, the saturable absorber 6 is optically bonded or otherwise attached to the gain crystal 5 without the need for high-cost active alignment and forms a monolithic, alignment-free laser resonator defined by the end mirrors 9 and 11. The saturable absorber 6 may be based on either a solid-state or semiconductor material. The well-known example of solid-state based saturable absorber is Cr:YAG. These crystals are commercially available from several commercial suppliers, e.g. from Casix Semiconductor-based saturable absorbers, also known as semiconductor saturable absorber mirrors (SESAM) have also been known for some time. They can be based on such material systems as InGaAsP and are also available from several commercial suppliers, e.g. from Del Mar Photonics. The use of solid-state-based saturable absorbers in a microchip laser is described in the literature, e.g. by J. J. Zayhowski and C. Dill III, "Diode-pumped passively Q-switched picosecond microchip lasers," Optics Letters, vol. 19, p. 1427 (1994). The use of SESAM is described, e.g. in a paper by R. Fluck, B. Braun, E. Gini, H. Melchior, and U. Keller, "Passively Q-switched 1.34-micron Nd:YVO$_4$ microchip laser with semiconductor saturable-absorber mirrors," Optics Letters, vol. 22, p. 991 (1997). The laser cavity mirrors 9 and 11, which are essentially optical coatings or semiconductor epitaxial layers, are designed to provide high reflectivity at the target infrared wavelength. In most Nd-based solid-state gain elements 6 (including Nd:YAG, Nd:YVO$_4$, Nd:GdVO$_4$, Nd:YLF, etc.), the most efficient lasing wavelength is approximately 1064 nm. However, lasing at other infrared wavelengths such as 946 nm, 914 nm, 1340 nm, etc. can also be obtained by providing high reflectivity end mirrors at these wavelengths and ensuring that the reflectivity of these mirrors at the dominant 1064 nm wavelength is low enough to suppress lasing at that wavelength. Thus, a passively Q-switched operation is established at the fundamental infrared wavelength and the intracavity fundamental wavelength beam 12 (illustrated by a two-sided arrow to show the circulating nature of that beam) is outcoupled into the beam 13.

To illustrate the laser conversion into ultraviolet, we consider the specific case of a Nd:YAG or Nd:YVO$_4$ microchip laser with Cr:YAG saturable absorber, producing passively Q-switched, 1064 nm wavelength output. For a properly optimized laser system, one can approach ~50% conversion efficiency from 808 nm pump to 1064 nm in TEM$_{00}$ spatial mode. Thus, ~2W pump diode can deliver ~1W average power output at 1064 nm. The repetition rate will be in the tens of kHz range and pulse duration will be nanoseconds and sub-nanosecond. The diameter of the output infrared beam 12 is suitably in the range 100 to 300 microns. In continuous-wave operation, one would need strong focusing to achieve SHG conversion into only several milliwatts of green (532 nm) light. However, pulsed (passively Q-switched) output allows obtaining high peak power levels that significantly increase conversion efficiency. For a Cr:YAG saturable absorber, the typical pulse duration is on the order of 1 ns and the repetition rate will be on the order of several tens of kHz. The high conversion efficiency can be appreciated from the analysis of Eq. (6) where all power variables for the pulsed operation correspond to the instantaneous power in the pulse due to the substantially instantaneous nature of nonlinear processes. For the laser system of this invention, Eq.(6) is not perfectly applicable since this equation is obtained under the assumption of a non-depleted fundamental beam. Thus, most of the 1064 nm infrared beam can be converted into the 532 nm green beam via SHG.

The second-harmonic crystal 7 shown in FIG. 1 is suitably PPMgOLN, PPZnOLN, or PPSLN since these crystals have highest available nonlinearity $d_{eff}$~15-16 pm/V. However, lithium tantalate based periodically poled materials with a nonlinearity ~10 pm/V are also efficient enough to provide >80% conversion into the green wavelength. FIG. 1 illustrates the second-harmonic beam 14 generated in the periodically-poled crystal 7. The lateral separation of the fundamental beam 13 and the second-harmonic beam 14 in FIG. 1 is for illustration purposes. In actual practice, these beams are necessarily spatially overlapped.

Further, the remaining fundamental beam 13 and the second-harmonic beam 14 are mixed in periodically poled crystal 8 to generate third-harmonic, ultraviolet light. The crystal 8 is suitably lithium-tantalate based crystal: PPSLT, (periodically poled stoichiometric lithium tantalate) PPMgOLT, (periodically poled MgO doped lithium tantalate) or PPZnOLT (periodically poled ZnO doped lithium tantalite). The reason why lithium tantalate is preferred over periodically poled lithium niobate crystals is that lithium tantalate crystals have a lower short-wavelength absorption edge ~280 nm compared to ~320 nm for lithium niobate. This allows using lithium tantalate as an efficient nonlinear material for third-harmonic generation into the ultraviolet. Using PPMgOLN, PPZnOLN, and PPSLN is also within the scope of this invention but the efficiency of these materials is lower due to higher absorption.

To obtain the maximum third-harmonic output, it is important not to deplete the fundamental infrared beam to the level that there is not enough power left to mix it with the second harmonic for the third harmonic generation. This can be achieved by using a short crystal or via temperature detuning of the second harmonic crystal 7 to reduce the converted second-harmonic power to the desired level. The third-harmonic crystal 8 is then temperature tuned to produce the maximum UV output. The UV output beam is illustrated by the arrow 15, which overlaps with beams 13 and 14 but is laterally separated from them in FIG. 1 for illustration. The beams 13 and 14 can then be blocked or deflected with a filter or coated optics to leave the ultraviolet beam as the only laser source output. In the example we are considering for a 1064 nm fundamental infrared laser, several tens of milliwatts of average ultraviolet-beam (355 nm) power can be obtained. The required nonlinear crystal lengths are only 1-3 mm.

One advantage of the efficient UV laser source of FIG. 1 is its compactness and low-cost architecture. When traditional nonlinear materials, such as LBO, are used, one would have to work against a two-order of magnitude disadvantage in conversion efficiency compared to periodically poled materials. Therefore, additional focusing elements (lenses), longer crystals, and a means of increasing peak pulse power would have to be designed to produce the desired performance in the UV. This is not necessary in the design of FIG. 1 and it eliminates costly elements and labor (alignment steps). Furthermore, periodically poled nonlinear crystals 7 and 8 can be integrated and designed as a single periodically poled chip. For the reasons explained above, lithium tantalate based crystals are preferred in this case. The fabrication of such nonlinear crystals can be done with a dual period poling mask so that the resulting crystal has two poling sections optimized for both nonlinear SHG and THG conversions. Another major advantage of periodically poled crystals is the absence of walk-off between the fundamental beam and other harmonics. This factor is a major limiting factor in efficiency and cost for traditional bulk nonlinear materials (including KTP, LBO, BBO, CLBO, $KNbO_3$, $LiNbO_3$) and expensive schemes such as using more than one crystal for walk-off compensation or heating or cooling the crystal to extreme temperatures for noncritical (walk-off-free) phase matching have to be used.

While FIG. 1 illustrates an efficient and preferred embodiment for the passively Q-switched ultraviolet laser source, there are instances when traditional bulk nonlinear materials are preferable for conversion into the ultraviolet. This is illustrated in the second embodiment of the present invention shown in FIG. 2. The architecture for the fundamental and second-harmonic beam generation is the same as in FIG. 1 and the efficient visible light generation is again enabled by the efficient periodically poled nonlinear materials selected as described in this invention. However, the conversion into the ultraviolet is done using bulk nonlinear materials such as BBO, CLBO, LBO, or CBO. One case when using these materials is necessary is to obtain shorter ultraviolet wavelengths, such as 266 nm, via fourth-harmonic generation (FHG) process. In this case, the ultraviolet output is obtained via frequency doubling of the second-harmonic beam 14 in the bulk nonlinear crystal 16.

Figure 2:
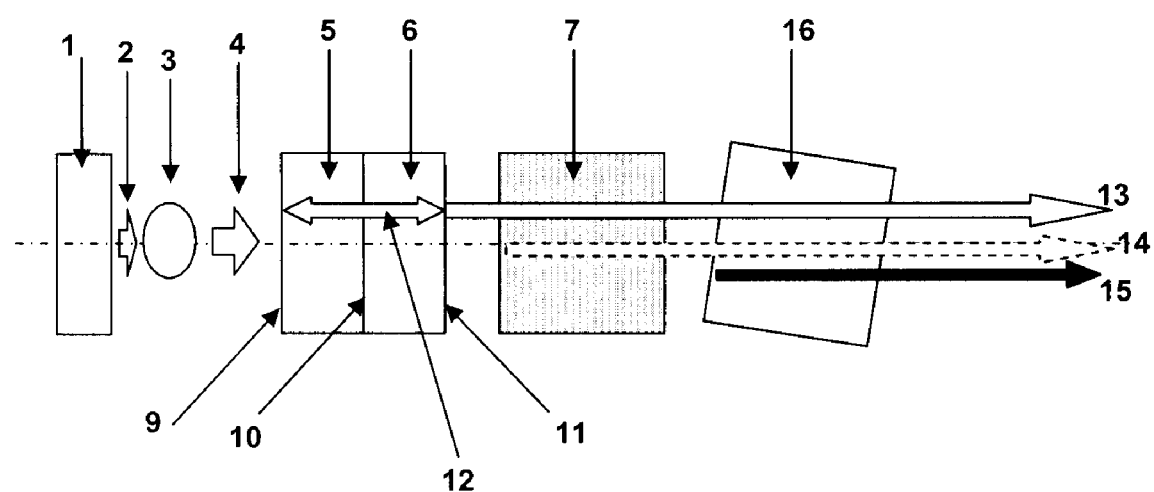
FIG. 2. Ultraviolet, pulsed laser source with passively Q-switched, infrared, solid-state, microchip laser, external second-harmonic generation using a periodically poled nonlinear crystal, and external third or fourth harmonic generation using a bulk nonlinear crystal.

Another case, when the design of FIG. 2 may be advantageous relative to the design of FIG. 1 is the potentially simpler temperature control of this design, in either THG or FHG case. In this case, one can use the critical phase-matching in material such as BBO, CLBO, LBO, or CBO and tune the bulk crystal into phase matching so both the SHG periodically poled crystal 7 and THG (or FHG) bulk crystal 16 are optimized at the same temperature so they can be controlled by the same thermoelectric cooler.

In some applications, such as the detection of fluorescing particles via flow cytometry, a continuous-wave (cw) ultraviolet source may be preferred over the pulsed one. In this case, the external-nonlinear-conversion architectures displayed in FIGS. 1 and 2 are not going to provide enough efficiency to generate more than one milliwatt of the ultraviolet output, even with the high efficiency of periodically poled materials. The architecture we propose in this invention for a cw ultraviolet laser source will take advantage of efficient intracavity frequency doubling of the infrared solid-state laser using a periodically poled nonlinear material. For the example considered above, over 500 mW of the 532 nm green output can be obtained by using PPMgOLN as the intracavity frequency doubler crystal. A more detailed description of such compact and efficient intracavity frequency doubled architectures can be found in copending, commonly assigned U.S. Provisional Patent Application by S. Essaian and A. V. Shchegrov, "Efficient, compact, and reliable solid-state laser with nonlinear frequency conversion in periodically poled materials" Ser. No. 60/795/212 filed Apr. 27, 2006 the teaching of which is incorporated herein by this reference.

Figure 3:
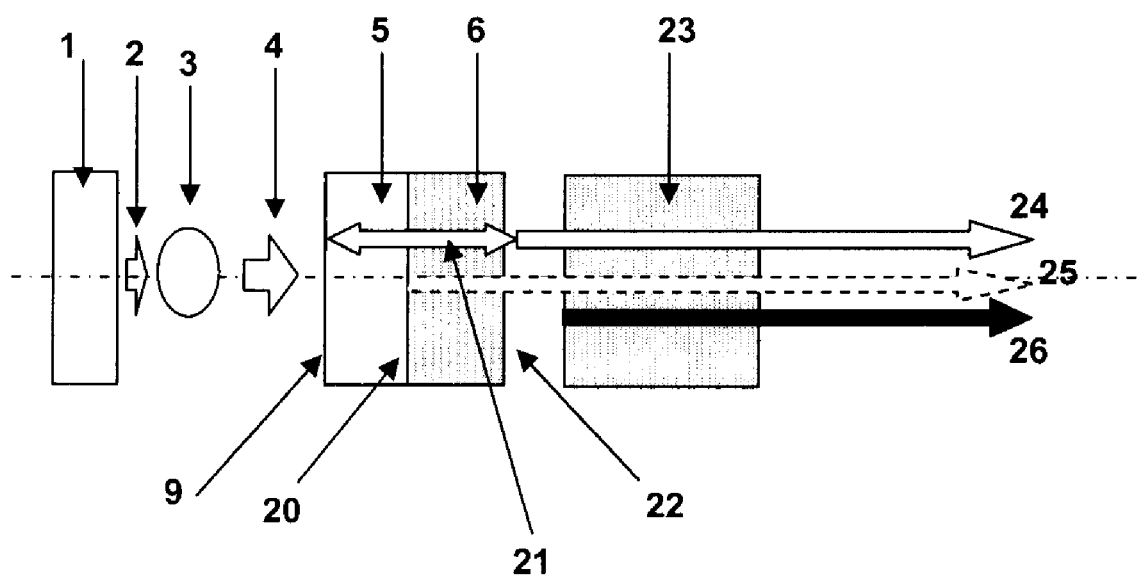
FIG. 3. Ultraviolet, cw laser source with a cw, infrared, solid-state, microchip laser with intracavity second-harmonic generation using a periodically poled nonlinear crystal, and external third harmonic generation a periodically poled nonlinear crystal.
Figure 4:
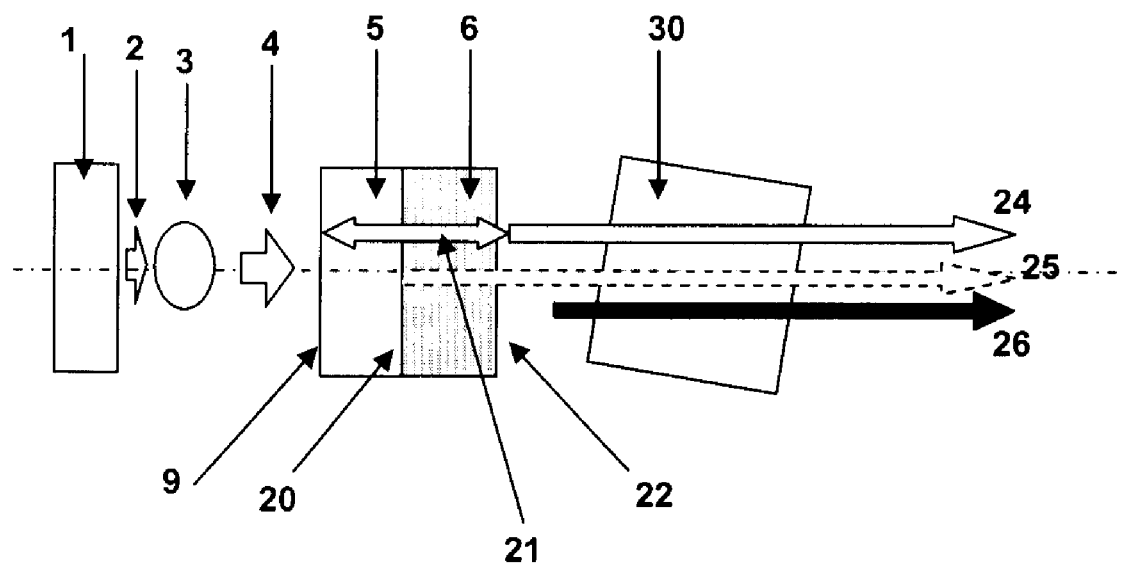
FIG. 4. Ultraviolet, cw laser source with a cw, infrared, solid-state, microchip laser with intracavity second-harmonic generation using a periodically poled nonlinear crystal, and external third or fourth harmonic generation a bulk nonlinear crystal.

Since sufficiently powerful (hundreds of milliwatts to Watts, depending on the pump and lasing wavelength) visible output is generated, it can be used for generating UV externally either through THG or FHG. The architectures for cw ultraviolet laser source are illustrated in FIGS. 3 and 4. The design of FIG. 3 relies on periodically poled nonlinear material 23 for external THG into the UV wavelength region, while the design of FIG. 4 relies on bulk nonlinear material 30. The UV conversion concepts of FIGS. 3 and 4 are analogous to those shown in FIGS. 1 and 2, respectively. Using efficient periodically poled materials 23, 30 remains the main feature of all these embodiments. It must be noted that for the case of the THG, the outcoupling surface 22 will advantageously be coated for partial transmission at the fundamental wavelength. In the case of FHG, the surface 22 is coated for high reflection at the fundamental wavelength and for high transmission at the second-harmonic (visible) wavelength. For the example of 1064 nm fundamental beam, tens of milliwatts of cw power can be obtained at 355 nm and sub-milliwatt to milliwatt-level output are obtained at 266 nm. These power output levels are sufficient for many applications of compact UV lasers, especially in detecting fluorescence.

Figure 5:
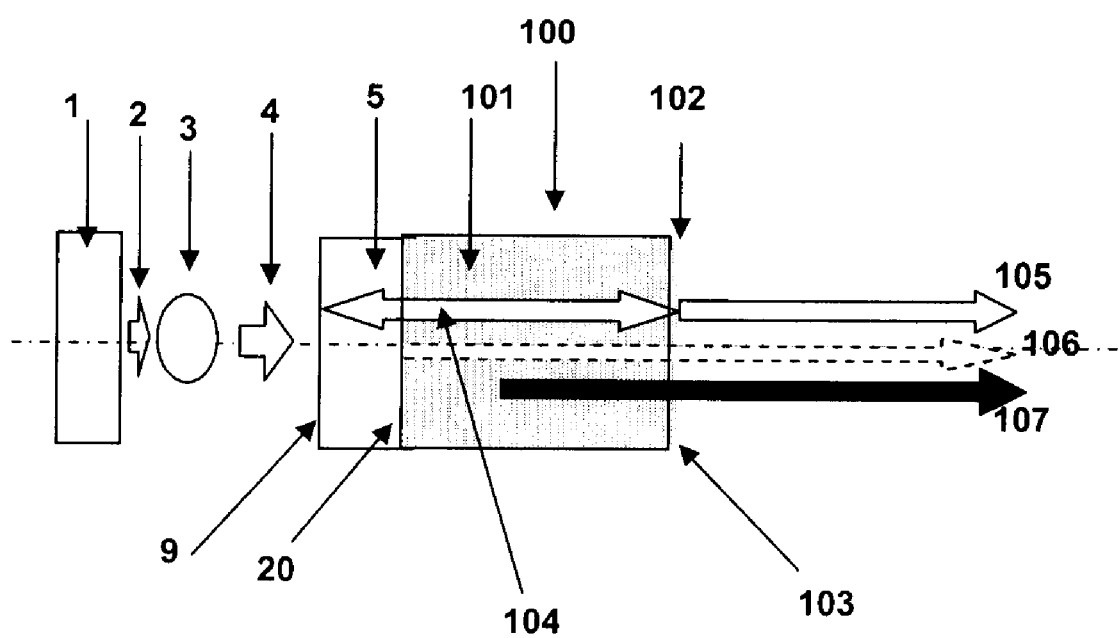
FIG. 5 Ultraviolet cw laser source with cw infrared, solid-state, microchip laser with both intracavity second and third harmonic generation using the single nonlinear element with two periodically poled sections.

The design of FIG. 5 demonstrates the architecture of an extremely compact and efficient ultraviolet laser source of 355 nm, 315 nm and 305 nm using an infrared, solid-state, microchip laser with intracavity second-harmonic generation using the first periodically poled section of a periodically poled nonlinear crystal, and an intracavity third harmonic generation using the second periodically, poled section of a periodically poled nonlinear crystal. For this application PPSLT or PPMgOSLT and PPZnOSLT(with 0.1-1% MgO and ZnO doped) nonlinear crystals are preferable to use due to low optical losses of $LiTaO3$ material at 280-350 nm UV spectral region.

In FIG. 5, 105 is the outcoupled infrared beam, preferably blocked by the coated surface 103 that defines the end of the infrared laser cavity. The coating 103 is designed for ~100% reflection of the fundamental infrared beam (101) and high transmission of the second and third harmonics. 101 is the intracavity infrared beam, circulating in the laser cavity. 106 is the second-harmonic beam. For clarity, only one direction of propagation of this beam is shown. The backward generated second harmonic beam (not shown) can be recovered by a suitable coating at surface 9 or at the interface 20. 107 is the third-harmonic beam. Similarly, only one direction of propagation of this beam is shown. No third harmonic is generated in the backward direction. 100 is a periodically poled crystal consisting of two sections: 101 (second-harmonic section) and 102 (third harmonic section).

The designs illustrated in FIGS. 1-5 are general to the efficient generation of ultraviolet light starting from essentially any infrared wavelength available through a solid-state laser platform. Therefore, frequency doubled or quadrupled UV laser sources obtained via conversion of 946 nm, 914 nm, 1340 nm, and other available solid-state laser wavelengths, are also within the scope of this invention.

Figure 6:
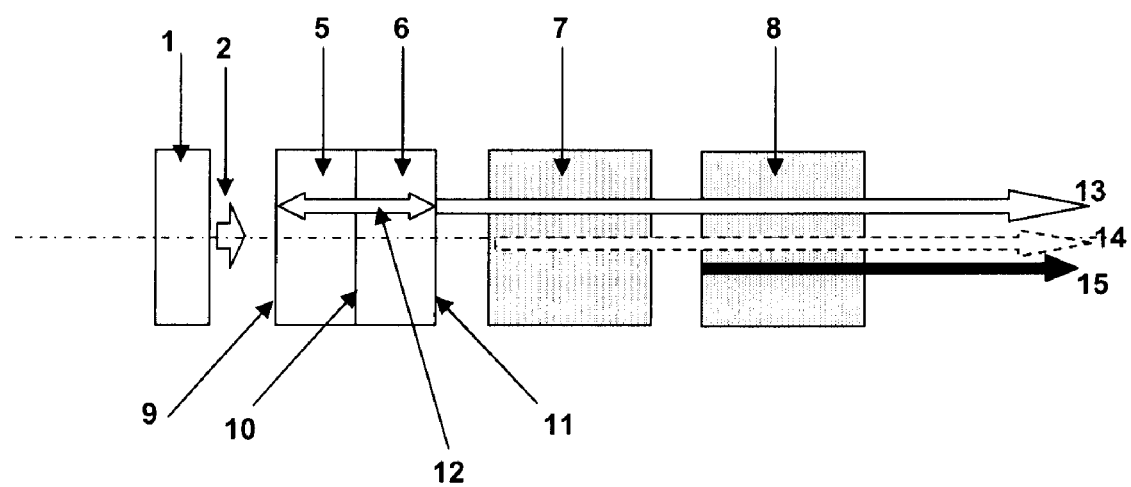
FIG. 6. Ultraviolet, pulsed laser source with passively Q-switched, infrared, solid-state, microchip laser, external second-harmonic generation using a periodically poled nonlinear crystal, and external third harmonic generation using a periodically poled nonlinear crystal. Pump laser energy is delivered to the gain crystal without beam shaping optics.

FIG. 6 illustrates an ultraviolet, pulsed laser source with a passively Q-switched, infrared, solid-state, microchip laser, external second-harmonic generation using a periodically poled nonlinear crystal, and external third harmonic generation using a periodically poled nonlinear crystal. Pump laser energy is delivered to the gain crystal without beam shaping optics, since, as noted above, when efficiency can be sacrificed in favor of simplicity and compactness, it is appropriate to eliminate the beam-shaping optics between the pump diode laser 1 and the gain material 8. The pump diode laser 1 emits a beam 2 directly into the gain material 8 at a wavelength providing for efficient absorption into the gain material 8. The UV conversion concepts of FIG. 6 are analogous to those shown and described, above, with respect to FIG. 1.

It must also be stated that the above description of our invention focused on illustrating the novel and enabling designs for UV laser sources based on periodically poled, nonlinear materials. Manufacturing a reliable UV laser source product usually requires additional effort to avoid optics contamination, maintain laser stability via an adequate control algorithm, and prevent optics surface damage by using translation of THG or FHG crystals to spread the UV exposure over extended crystal area. All of these engineering techniques known to persons skilled in the art of ultraviolet laser sources and are also applicable to the practice of the present invention. The teaching of the following references is incorporated herein in their entirety by this reference.

1. D. Dudley, N. Hodgson, H. Hoffman, and O. Mehl, "Diode pumped laser with intracavity harmonics," U.S. Pat. No. 7,016,389.
2. W. P. Risk, T. R. Gosnell and A. V. Nurmikko, "Compact Blue-Green Lasers", Cambridge University Press (2003).
3. A. J. Alfrey and E. Sinofsky, "High efficiency high repetition rate, intra-cavity tripled diode pumped solid state laser," U.S. Pat. No. 6,002,695
4. W. M. Grossman and J. D. Kmetec, "Intracavity resonantly enhanced fourth harmonic generation using uncoated Brewster surfaces," U.S. Pat. No. 6,697,391.
5. X. Wu, J. P. Partanen, W. F. Hug, and H. Hemmati, "Laser with optimized coupling of pump light to a gain medium in a side-pumped geometry," U.S. Pat. No. 6,157,663.
6. P. Georges, F. Balembois, F. Druon, A. Brun, P. J. Devilder, "Sub-nanosecond passively Q-switched microchip laser system," U.S. Pat. No. 6,373,864.
7. D. C. Gerstenberger and M. Bowers, "Methods and devices for efficient generation of ultraviolet light," U.S. Pat. No. 6,741,620.
8. K. Mizuuchi, A. Morikawa, T. Sugita, K. Yamamoto, N. Pavel, and T. Taira, "Continuous-wave ultraviolet generation at 354 nm in a periodically poled $MgO:LiNbO_3$ by frequency tripling of a diode end-pumped $Nd:GdVO_4$ microlaser," Applied Physics Letters, vol. 85, p. 3959 (2004).
9. T. Volk, N. Rubinina, M. Wöhlecke, "Optical-damage-resistant impurities in lithium niobate," Journal of the Optical Society of America B, vol. 11, p. 1681 (1994).
10. Y. Furukawa, K. Kitamura, S. Takekawa, K. Niwa, H. Hatano, "Stoichiometric $Mg:LiNbO_3$ as an effective material for nonlinear optics," Optics Letters, vol. 23, p. 1892 (1998).
11. Spectralus Corporation Web Site: http://www.spectralus.com
12. S. Essaian, "Method for the fabrication of periodically poled lithium niobate and lithium tantalate nonlinear optical components," US patent application 2005/0,133,477.
13. L. Glebov, "Optimizing and Stabilizing Diode Laser Spectral Parameters." Photonics Spectra, January 2005.
14. S. Essaian and A. V. Shchegrov, "Efficient, compact, and reliable solid-state laser with nonlinear frequency conversion in periodically poled materials," U.S. provisional patent application.
15. H. Liu, O. Hornia, Y. C. Chen, and S.-H. Zhou, "Single-frequency Q-switched Cr—Nd:YAG laser operating at 946-nm wavelength," IEEE Journal of Selected Topics in Quantum Electronics, Vol. 3, p. 26 (1997).
16. J. J. Zayhowski and C. Dill III, "Diode-pumped passively Q-switched picosecond microchip lasers," Optics Letters, vol. 19, p. 1427 (1994).
17. R. Fluck, B. Braun, E. Gini, H. Melchior, and U. Keller, "Passively Q-switched 1.34-mm $Nd:YVO_4$ microchip laser with semiconductor saturable-absorber mirrors," Optics Letters, vol. 22, p. 991 (1997).

The invention claimed is:

1. An ultraviolet, pulsed solid-state laser comprising:
a solid state laser cavity defined by two end mirrors;
a solid state gain crystal pumped by a semiconductor diode laser and disposed between the two end mirrors;
a saturable absorber element providing passive Q-switching;
a first nonlinear crystal providing frequency doubling of a fundamental infrared-wavelength laser beam into a visible-wavelength laser beam, the first nonlinear crystal being periodically poled and having at least one of material stoichiometry and doping; and
a second nonlinear crystal providing nonlinear conversion of the visible-wavelength and infrared-wavelength laser beams into an ultraviolet-wavelength laser beam;
wherein the second nonlinear crystal is selected from the group consisting of: periodically poled MgO-doped lithium niobate, periodically poled MgO-doped lithium tantalate, periodically poled ZnO-doped lithium niobate, periodically poled ZnO-doped lithium tantalate, periodically poled stoichiometric or near-stoichiometric lithium niobate, and periodically poled stoichiometric or near-stoichiometric lithium tantalate.

2. The laser of claim 1, wherein the solid-state gain crystal is selected from the group consisting of: $Nd:YVO_4$, $Nd:GdVO_4$, $Nd:YGdVO_4$, Nd:YAG, and Nd:YLF.

3. The laser of claim 1, wherein a pump laser beam from the semiconductor diode laser is delivered to the gain crystal via a microlens or a gradient-index lens.

4. The laser claim 1, wherein a pump laser beam from the semiconductor diode laser is delivered to the gain crystal directly, without beam shaping optics.

5. The laser of claim 1, wherein a pump laser beam from the semiconductor diode laser is spectrally narrowed using a volume Bragg grating.

6. The laser of claim 1, wherein the first nonlinear crystal is selected from the group consisting of: periodically poled MgO-doped lithium niobate, periodically poled MgO-doped lithium tantalate, periodically poled ZnO-doped lithium niobate, periodically poled ZnO-doped lithium tantalate, periodically poled stoichiometric or near-stoichiometric lithium niobate, and periodically poled stoichiometric or near-stoichiometric lithium tantalate.

7. The laser of claim 1, the laser further comprising a third non-linear crystal disposed externally to the laser cavity and selected from the group consisting of: Lithium Borate, Beta Barium Borate, Cesium Lithium Borate, and Cesium Borate.

8. The laser of claim 1, wherein the fundamental infrared-wavelength laser beam operates at a wavelength selected from the group consisting of: 1064 nm, 946 nm, 914 nm, and 1340 nm.

9. The laser of claim 1, wherein the ultraviolet wavelength beam is obtained via third-harmonic generation in the second nonlinear crystal and is emitted at approximately a wavelength selected from the group consisting of: 355 nm, 315 nm, and 305 nm.

10. The laser of claim 1, wherein the saturable absorber element comprises a doped solid-state gain crystal.

11. The laser of claim 10, wherein the saturable absorber element comprises a Cr:YAG crystal.

12. The laser of claim 1, wherein the saturable absorber element comprises an epitaxially grown semiconductor.

13. An ultraviolet, pulsed solid-state laser comprising:

a solid state laser cavity defined by two end mirrors;

a solid state gain crystal pumped by a semiconductor diode laser and disposed between the two end mirrors;

a saturable absorber element providing passive Q-switching;

a first nonlinear crystal providing frequency doubling of a fundamental infrared-wavelength laser beam into a visible-wavelength laser beam, the first nonlinear crystal being periodically poled and having at least one of material stoichiometry and doping; and a second nonlinear crystal providing nonlinear conversion of the visible-wavelength and infrared-wavelength laser beams into an ultraviolet-wavelength laser beam;

wherein the ultraviolet-wavelength laser beam is obtained via fourth-harmonic generation in the second nonlinear crystal and is emitted at or near the wavelengths selected from the group consisting of: 266 nm, 237 nm, 229 nm, and 335 nm.

14. An ultraviolet continuous-wave laser comprising:

a solid state laser cavity defined by two end mirrors;

a solid-state gain crystal pumped by a semiconductor diode laser and disposed between the two end mirrors;

a first nonlinear crystal providing intracavity frequency doubling of an infrared-wavelength laser beam into a visible-wavelength laser beam, the crystal being periodically poled and having material stoichiometry or doping;

a second nonlinear crystal providing extracavity nonlinear conversion of the visible-wavelength and infrared-wavelength beams into an ultraviolet-wavelength laser beam;

wherein the external nonlinear crystal is selected from the group consisting of: periodically poled MgO-doped lithium niobate, periodically poled MgO-doped lithium tantalate, periodically poled ZnO-doped lithium niobate, periodically poled ZnO-doped lithium tantalite, periodically poled stoichiometric or near-stoichiometric lithium niobate, and periodically poled stoichiometric or near-stoichiometric lithium tantalate.

15. The laser of claim 14, wherein the solid-state gain crystal is selected from the group consisting of: $Nd:YVO_4$, $Nd:GdVO_4$, $Nd:YGdVO_4$, Nd:YAG, and Nd: YLF.

16. The laser of claim 14, wherein a pump laser beam from the semiconductor diode laser is delivered to the gain crystal via a microlens or a gradient-index lens.

17. The laser of claim 14, wherein a pump laser beam from the semiconductor diode laser is delivered to the gain crystal directly, without beam shaping optics.

18. The laser of claim 14, wherein a pump laser beam from the semiconductor diode laser is spectrally narrowed using a volume Bragg grating.

19. The laser of claim 14, wherein the first nonlinear crystal is selected from the group consisting of: periodically poled MgO-doped lithium niobate, periodically poled MgO-doped lithium tantalate, periodically poled ZnO-doped niobate, periodically poled ZnO-doped tantalate, periodically poled stoichiometric or near-stoichiometric lithium niobate, and periodically poled stoichiometric or near-stoichiometric lithium tantalate.

20. The laser of claim 14, the laser further comprising a third nonlinear crystal disposed externally to the laser cavity and selected from the group consisting of: Lithium Borate, Beta Barium Borate, Cesium Lithium Borate, and Cesium Borate.

21. The laser of claim 14, wherein the infrared-wavelength laser beam operates at or near a wavelength selected from the group consisting of: 1064 nm, 946 nm, 914 nm, 1340 nm.

* * * * *